US011084686B2

(12) United States Patent
Chappell, II et al.

(10) Patent No.: US 11,084,686 B2
(45) Date of Patent: Aug. 10, 2021

(54) CABLE STORAGE DEVICES AND METHODS OF USE THEREOF

(71) Applicant: Prince George Electric Cooperative, Waverly, VA (US)

(72) Inventors: Walter L. Chappell, II, Chester, VA (US); Harold L. Chambers, III, Wakefield, VA (US)

(73) Assignee: PRINCE GEORGE ELECTRIC COOPERATIVE, Waverly, VA (US)

( * ) Notice: Subject to any disclaimer, the term of this patent is extended or adjusted under 35 U.S.C. 154(b) by 31 days.

(21) Appl. No.: 15/870,387

(22) Filed: Jan. 12, 2018

(65) Prior Publication Data

US 2019/0219198 A1 Jul. 18, 2019

(51) Int. Cl.

| B65H 75/44 | (2006.01) |
|---|---|
| F16L 3/01 | (2006.01) |
| H02G 7/05 | (2006.01) |
| F16L 3/26 | (2006.01) |
| B65H 75/36 | (2006.01) |
| H02G 11/02 | (2006.01) |
| G02B 6/44 | (2006.01) |

(52) U.S. Cl.
CPC ....... *B65H 75/4476* (2013.01); *B65H 75/364* (2013.01); *F16L 3/012* (2013.01); *F16L 3/26* (2013.01); *G02B 6/444* (2013.01); *H02G 7/05* (2013.01); *H02G 11/02* (2013.01); *B65H 2701/32* (2013.01)

(58) Field of Classification Search
CPC ... F16L 3/012; F16L 3/26; H02G 7/05; H02G 11/02; H02G 3/32; G02B 6/483; G02B 6/444; G02B 6/3897; G02B 6/4452; G02B 6/4457; G02B 6/4458; B65H 75/364; B65H 75/4476; B65H 49/30; B65H 2701/32
USPC ............ 385/134–137; 248/218.4, 89–93, 70; 211/85.5, 207, 103, 60.1, 70.6; 242/400.1, 388.6, 399, 397.2, 577.4, 242/577.2, 615.3
See application file for complete search history.

(56) References Cited

U.S. PATENT DOCUMENTS

| 28,297 A * | 5/1860 | Palmer et al. ......... B65H 49/30 |
|---|---|---|
| | | 242/577.3 |
| 1,543,122 A * | 6/1925 | Ravenscroft ........... B65H 49/30 |
| | | 242/396.5 |

(Continued)

*Primary Examiner* — Ingrid M Weinhold
(74) *Attorney, Agent, or Firm* — Troutman Pepper Hamilton Sanders LLP (Rochester)

(57) ABSTRACT

A cable storage device includes a first elongate bracket member attachable to a support structure and having a length extending between a first end and a second end. A second elongate bracket member is configured to be coupled to the first elongate bracket member proximate one of the first end or the second end such that the second elongate member extends in a different direction from the first elongate member when installed on the support structure. At least one set of a plurality of retaining mechanisms is configured to be coupled to the first and second elongate bracket members to receive and store a first cable. The at least one of the at least one set of the plurality of retaining mechanisms is adjustable along the first elongate bracket member or the second elongate bracket member. Methods of installing and making the cable storage device are also disclosed.

15 Claims, 7 Drawing Sheets

(56) References Cited

U.S. PATENT DOCUMENTS

| | | | | |
|---|---|---|---|---|
| 2,064,886 | A * | 12/1936 | Charlesworth | B65H 49/30 242/577.4 |
| 2,300,869 | A * | 11/1942 | Brandes, Jr. | B21C 47/30 242/575.5 |
| 3,072,358 | A * | 1/1963 | Knapp | B65D 85/04 242/129 |
| 3,731,886 | A * | 5/1973 | Macchi | B21C 47/28 242/602 |
| 3,906,146 | A * | 9/1975 | Taylor | H02G 3/045 174/72 A |
| 3,910,536 | A * | 10/1975 | Sharp | H02B 1/202 248/68.1 |
| 3,915,308 | A * | 10/1975 | Ratzloff | A47F 5/08 211/70.6 |
| 3,976,201 | A * | 8/1976 | Hodgson | A47F 5/0823 248/220.22 |
| 4,160,880 | A * | 7/1979 | Brey | H04Q 1/064 361/827 |
| 4,177,359 | A * | 12/1979 | Naranjo | H02G 15/076 174/72 A |
| 4,467,925 | A * | 8/1984 | Ratzloff | B25H 3/04 211/103 |
| 4,566,502 | A * | 1/1986 | Kellogg | H01B 13/012 140/92.1 |
| D342,015 | S * | 12/1993 | Andrejew | D6/553 |
| 5,758,002 | A * | 5/1998 | Walters | G02B 6/4452 385/134 |
| 5,788,087 | A * | 8/1998 | Orlando | H04Q 1/13 211/26 |
| 6,365,834 | B1 * | 4/2002 | Larsen | H02G 3/0443 174/100 |
| 6,398,149 | B1 * | 6/2002 | Hines | A47B 21/06 242/388.6 |
| 6,427,952 | B2 * | 8/2002 | Caveney | F16L 3/23 248/68.1 |
| 6,489,565 | B1 * | 12/2002 | Krietzman | H02G 3/045 174/101 |
| 6,533,205 | B1 * | 3/2003 | Kles | B65H 54/58 242/362 |
| 6,554,217 | B1 * | 4/2003 | Rodriguez | B65H 54/58 242/362 |
| 6,571,047 | B1 * | 5/2003 | Yarkosky | G02B 6/4452 385/135 |
| 6,600,107 | B1 * | 7/2003 | Wright | H02B 1/202 174/101 |
| 6,669,129 | B1 * | 12/2003 | Shah | B65H 54/56 242/362.2 |
| 6,818,833 | B2 * | 11/2004 | Dietrichson | B65H 75/364 174/135 |
| 6,819,857 | B2 * | 11/2004 | Douglas | G02B 6/4452 385/134 |
| 7,079,745 | B1 * | 7/2006 | Weinert | G02B 6/4457 385/134 |
| 7,260,302 | B2 * | 8/2007 | Caveney | G02B 6/4452 385/134 |
| 7,362,941 | B2 * | 4/2008 | Rinderer | H05K 7/186 385/134 |
| 7,431,610 | B2 * | 10/2008 | Laursen | H04Q 1/064 211/26 |
| 7,448,570 | B2 * | 11/2008 | Bohnisch | B65H 49/30 242/557 |
| 7,580,607 | B2 | 8/2009 | Jones et al. | |
| 7,627,223 | B1 * | 12/2009 | Burek | G02B 6/4457 385/134 |
| 7,637,771 | B2 * | 12/2009 | Laursen | H04Q 1/062 211/26 |
| 7,822,310 | B2 * | 10/2010 | Castonguay | G02B 6/4454 385/135 |
| 7,974,105 | B2 * | 7/2011 | Dean, Jr. | H04Q 1/062 361/826 |
| 8,003,890 | B2 * | 8/2011 | Donowho | H02G 3/0456 174/100 |
| 8,840,071 | B2 * | 9/2014 | Oh | F16L 3/1075 248/58 |
| 9,581,782 | B2 * | 2/2017 | Abby | G02B 6/4457 |
| 9,618,143 | B2 * | 4/2017 | Noble | F16L 3/24 |
| 9,908,738 | B1 * | 3/2018 | Toth | B65H 49/28 |
| 2004/0011547 | A1 * | 1/2004 | Wright | H04Q 1/064 174/50 |
| 2004/0035600 | A1 * | 2/2004 | Dietrichson | B65H 75/364 174/40 R |
| 2004/0094491 | A1 * | 5/2004 | Smith | G02B 6/4452 211/26 |
| 2005/0253015 | A1 * | 11/2005 | Bohnisch | B65H 49/30 242/578 |
| 2006/0171651 | A1 * | 8/2006 | Laursen | H04Q 1/064 385/135 |
| 2008/0205844 | A1 * | 8/2008 | Castonguay | G02B 6/4454 385/135 |
| 2010/0300999 | A1 * | 12/2010 | Schwartzkopf | A47B 96/061 211/104 |
| 2011/0150408 | A1 * | 6/2011 | Fewster | G02B 6/4459 385/135 |
| 2011/0262095 | A1 * | 10/2011 | Fabrykowski | G02B 6/4466 385/135 |
| 2016/0018024 | A1 * | 1/2016 | Noble | F16L 3/24 248/68.1 |
| 2016/0061354 | A1 * | 3/2016 | Abby | G02B 6/4457 211/85.5 |

\* cited by examiner

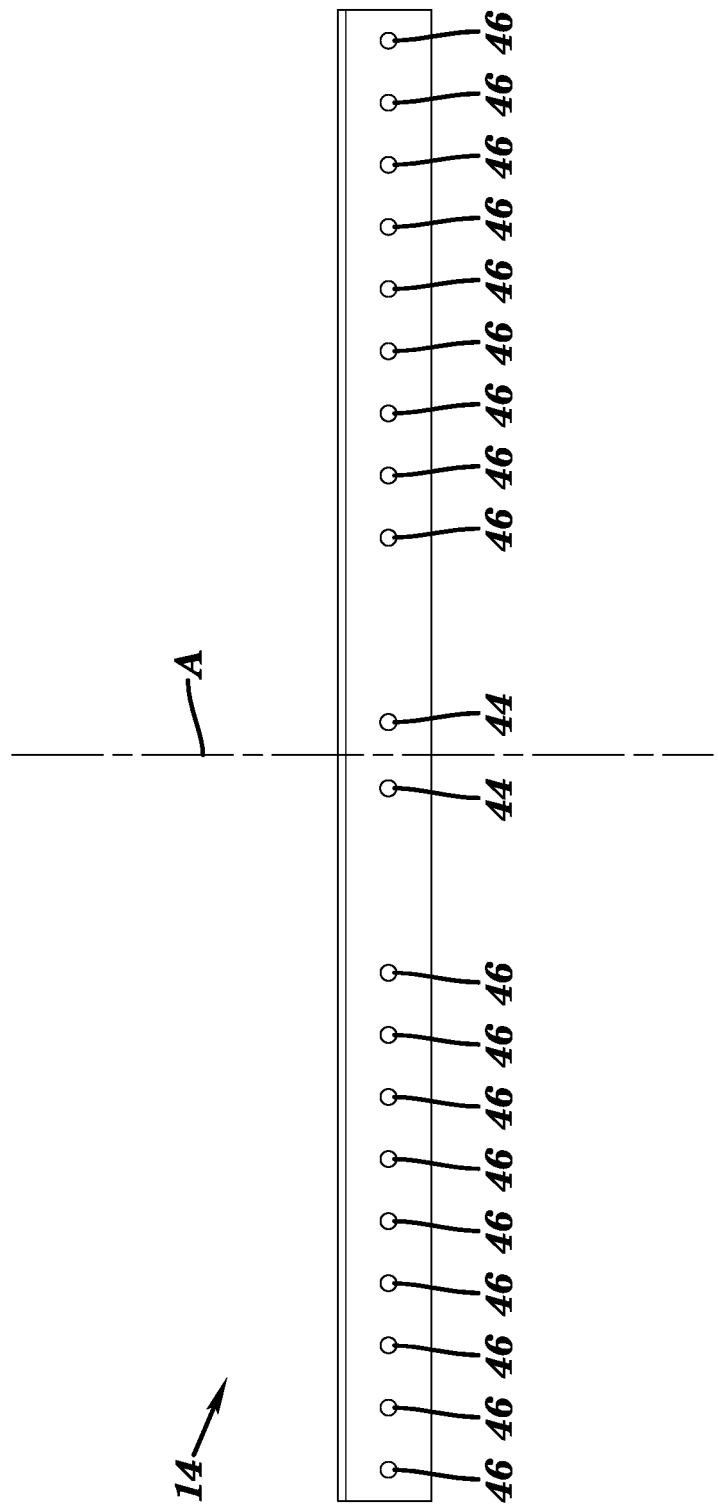

CABLE STORAGE DEVICES AND METHODS OF USE THEREOF

FIELD

This technology generally relates to a cable storage device and methods use thereof, and more particular to a storage device that may be utilized to store excess communications cables.

BACKGROUND

Overhead installation of communications cables, such as fiber optic transmission lines, frequently involves providing an excess, or slack, portion of the cable that is stored at or near a support structure for the overhead installation. For example, excess cable is often required along long pulls of fiber for later repairs and/or splices. In order to have sufficient excess cable, for example, for relocation of the cable requiring additional length, hundreds of feet of slack cable may need to be stored on the support structure.

Storage assemblies utilized for the storage of excess slack in overhead communication cables, such as snow shoe slack storage assemblies, are often time consuming to install. These devices also take a large amount of time to take down when the slack cable needs to be utilized for repairs and/or splices. This increases labor costs associated with repairs and/or splices involving the excess cable.

Additionally, previously exisiting storage assemblies often provide difficult access to the cable being stored thereon. Such storage assemblies also may be positioned on the support structures in areas that require a bucket truck to access the excess cable, rendering working with the excess cable more time consuming and dangerous. Further, these storage assemblies often lack adjustability to accommodate different sizes and lengths of cable depending on the specific application.

SUMMARY

A cable storage device includes a first elongate bracket member attachable to a support structure and having a length extending between a first end and a second end. A second elongate bracket member is configured to be coupled to the first elongate bracket member proximate one of the first end or the second end such that the second elongate member extends in a different direction from the first elongate member when installed on the support structure. At least one set of a plurality of retaining mechanisms is configured to be coupled to the first and second elongate bracket members to receive and store a first cable. The at least one of the at least one set of the plurality of retaining mechanisms is adjustable along the first elongate bracket member or the second elongate bracket member.

A method for installing a cable storage device includes attaching a first elongate bracket member having a length extending between a first end and a second end to a support structure. A second elongate bracket member is coupled to the first elongate bracket member proximate one of the first end or the second end such that the second elongate member extends in a different direction from the first elongate member when installed on the support structure. At least one set of a plurality of retaining mechanisms is coupled to the first and second elongate bracket members to receive and store a first cable. The at least one of the at least one set of the plurality of retaining mechanisms is adjustable along the first elongate bracket member or the second elongate bracket member.

A method of making a cable storage device includes providing a first elongate bracket member attachable to a support structure and having a length extending between a first end and a second end. A second elongate bracket member is coupled to the first elongate bracket member proximate one of the first end or the second end such that the second elongate member extends in a different direction from the first elongate member when installed on the support structure. At least one set of a plurality of retaining mechanisms coupled to the first and second elongate bracket members to receive and store a first cable. The at least one of the at least one set of the plurality of retaining mechanisms is adjustable along the first elongate bracket member or the second elongate bracket member.

This technology provides a number of advantages over prior cable storage mechanisms including providing cable storage devices and methods that provide a more effective and efficient user storage area for slack communications cable. In particular, this technology eliminates the need for commonly used snow show slack cable storage assemblies that require more time to install and take down when slack cable needs to be utilized or the splice enclosure needs to be accessed. The technology provides an all bolt together assembly that is easily assembled in the field using minimal equipment. Further, this technology can be positioned on a utility pole so that the user can access slack cable and the splice enclosure from a ladder, eliminating the need for a bucket truck This technology provides a number of other advantages as well including providing a modular storage device that may be easily installed on site using minimal tools. Additionally, this technology allows two different coils of necessary slack cable of different types and/or sizes to be stored in an easily accessible manner. Further, this technology is adjustable for a wide range of footages and coil sizes. This technology also advantageously includes rotating latches that allow quick and easy access to the stored cable. This technology also provides a location for attaching a splice enclosure on the same bracket.

BRIEF DESCRIPTION OF THE DRAWINGS

FIG. 4 is a front view of an exemplary second elongate bracket member of the exemplary cable storage device shown in FIG. 2.

DETAILED DESCRIPTION

Figure 1:
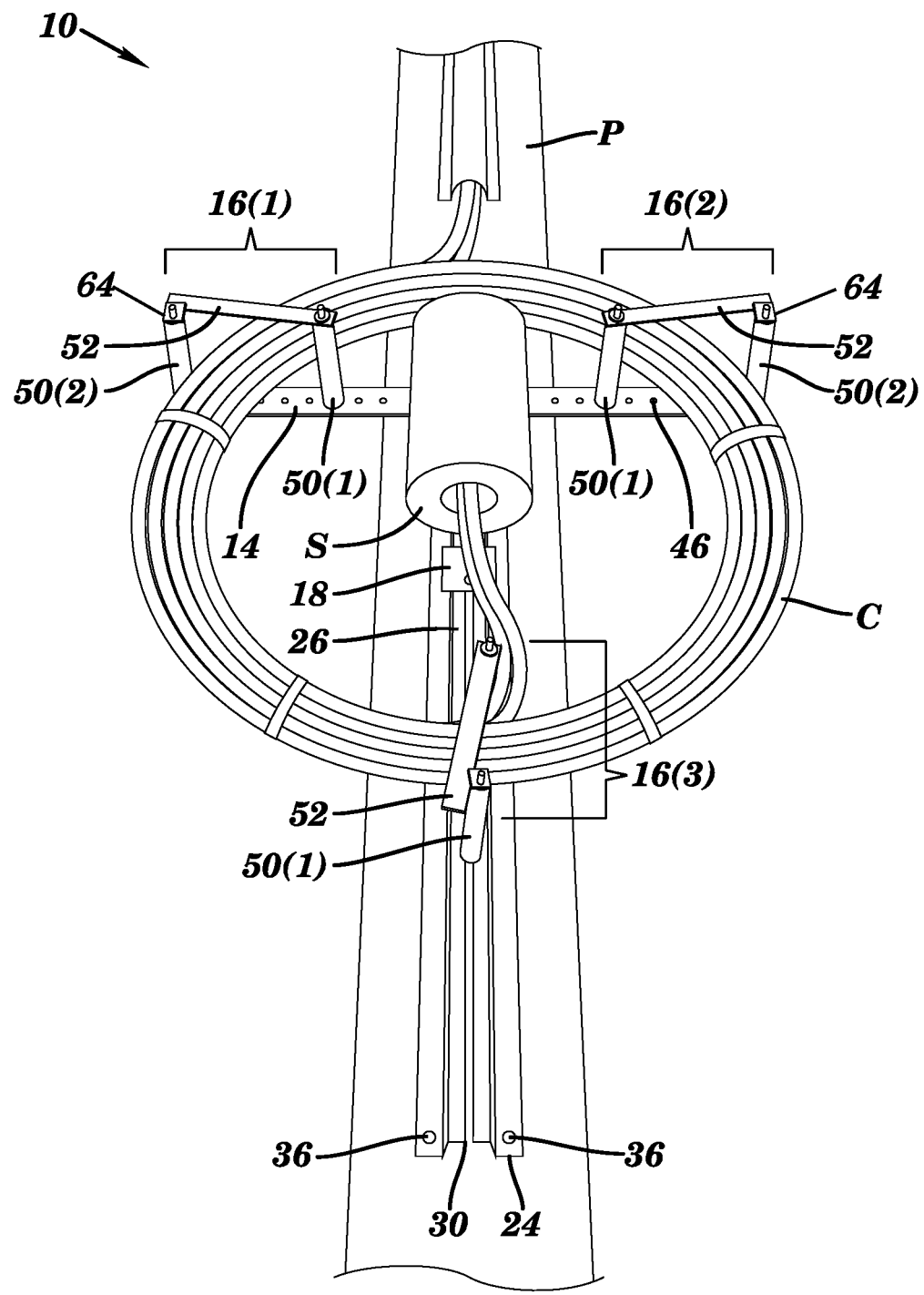
FIG. 1 is a front perspective view of an exemplary cable storage device installed on a utility pole with a communications cable stored therein.
Figure 2:
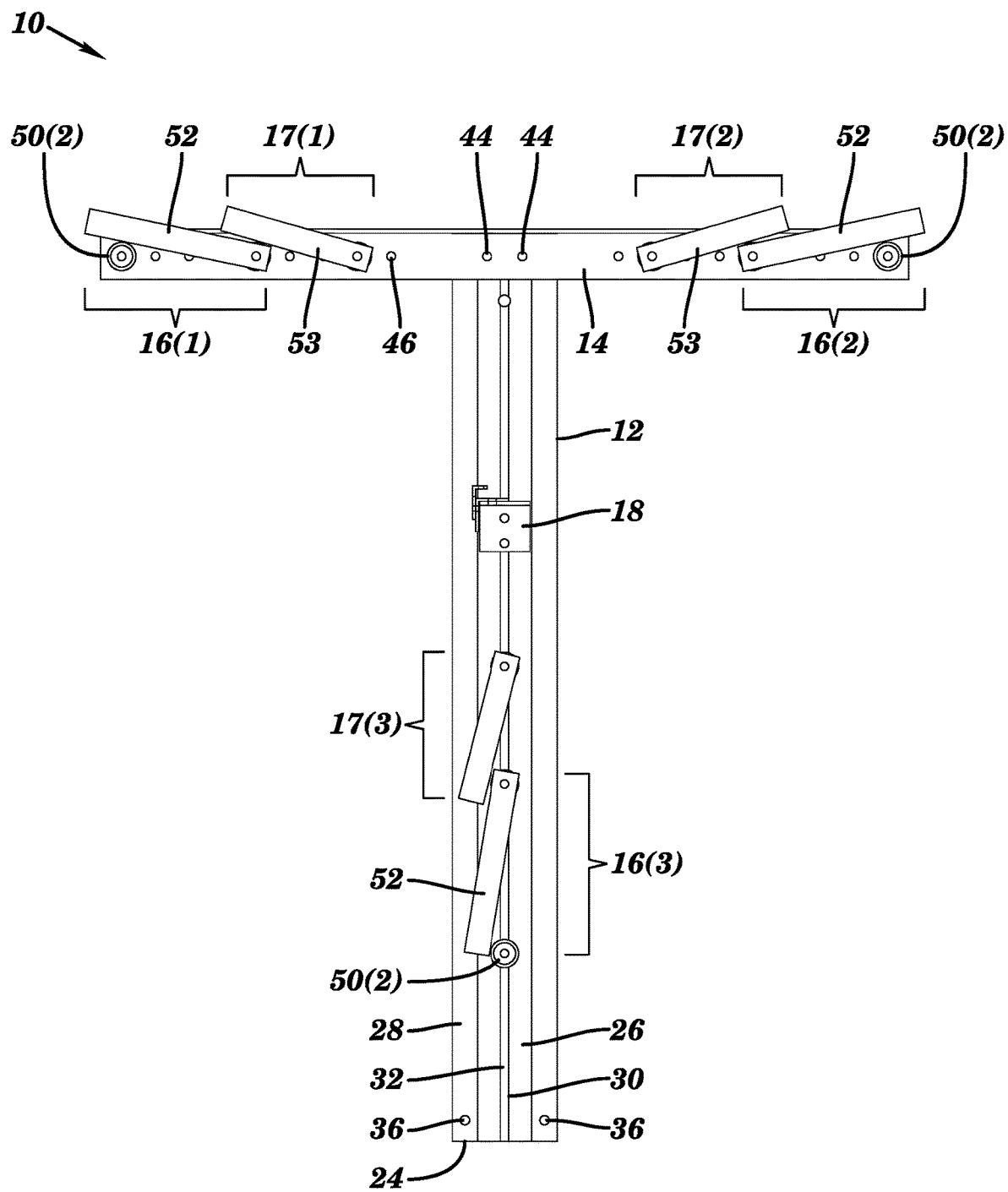
FIG. 2 is a schematic of the exemplary cable storage device with additional posts installed therein.

An exemplary cable device 10 of the present technology is illustrated in FIGS. 1-7. In this example, the cable storage device 10 includes a first elongate bracket member 12, a second elongate bracket member 14, retaining mechanisms 16(1)-16(3), and splicer support 18, although the cable storage device 10 may include other types and/or numbers of devices, elements, and/or components in other configurations, such as additional retaining mechanisms 17(1)-17(3) as shown in FIG. 2, by way of example only.

Referring more specifically to FIG. 1, the cable storage device 10 is configured to be installed on a utility pole P, although the cable storage device 10 can be installed on other types of support structures where excess cable may be stored. The cable storage device 10, in one example, is used to store excess communications cable C as shown in FIG. 1, such as a fiber optic communications cables, although the cable storage device 10 may be employed with other types of communications cables, such as coaxial cables or telephone cables, by way of example only. Further, the cable storage device 10 may be adjusted to accommodate additional communications cables, or communications cables of different sizes, as described with respect to further examples below.

The cable storage device 10 of the present technology provides a modular storage device for the slack communications cable C. In this particular example, the cable storage device 10 provides an all bolt together assembly that is easily assembled on the utility pole P in the field using minimal equipment and is easily accessible when installed, although other types of assemblies could be used. The cable storage device 10 of the present technology is also adjustable to allow for storing multiple coils of slack cable of different types and/or sizes. The cable storage device 10 further advantageously allows for quick and easy access to the stored cable. Although the cable storage device 10 is described as a modular unit, in some examples one or more elements of the cable storage device could be formed together as a single unit.

Figure 3A:
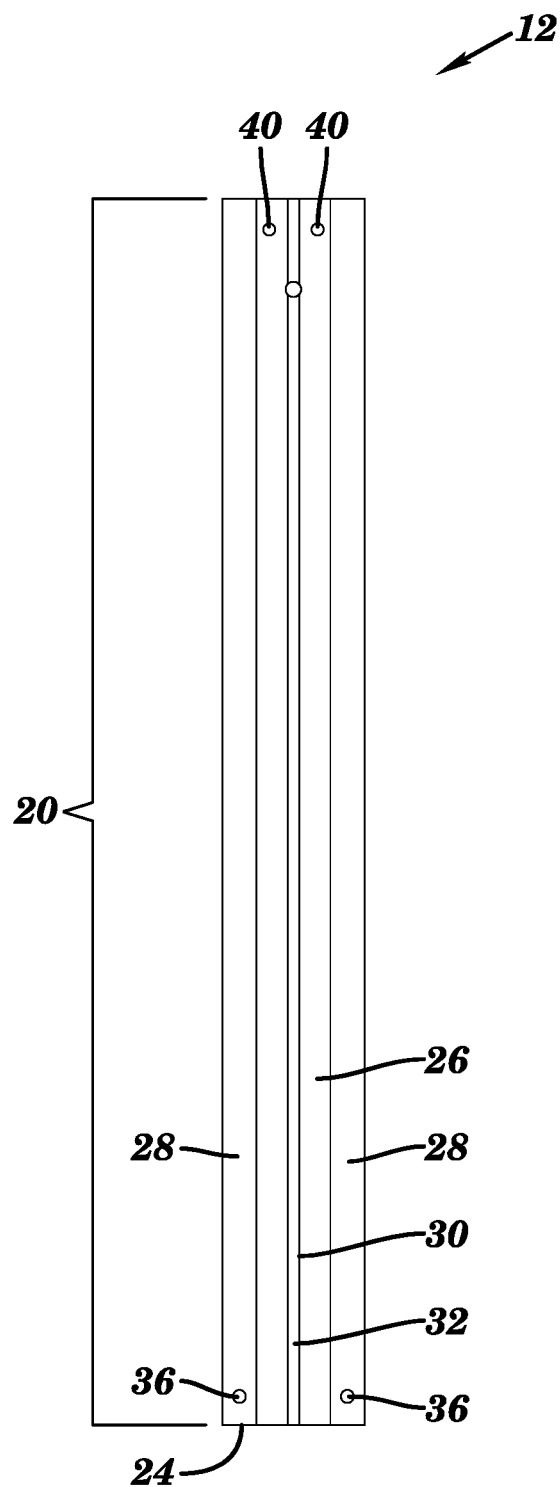
FIGS. 3A and 3B are front and end views of an exemplary first elongate bracket member of the exemplary cable storage device shown in FIG. 2.

Referring now more specifically to FIGS. 1, 2, 3A, and 3B, the first elongate bracket member 12 is attachable to a support structure, such as the utility pole illustrated in FIG. 1, although the elongate bracket member 12 may be coupled to any other support structure upon which excess communications cable may be stored. The first elongate bracket member 12 has a length 20, as shown in FIG. 3A, that extends between a first end 22 and a second end 24. In one example, the length 20 of the first elongate bracket member 12 is approximately 40-60 inches, although other lengths may be employed. In one example, the length 20 is about 54 inches. The first elongate bracket member 12 has a width of approximately 5-10 inches, although other widths may be utilized. In one example, the width of the first elongate bracket member is about 6.25 inches. In this example, the first elongate member 12 is formed from aluminum, although the first elongate member 12 may be formed of other types of materials, such as metals, plastics, or alloys, by way of example only.

The first elongate bracket member 12 includes a main body 26 and flanges 28 that extend out from the main body 26 such that the main body 26 is located between the flanges 28. The main body 26 extends outwardly from the flanges 28 when installed on a support structure, such as the utility pole P shown in FIG. 1 to provide a space 23 for a track portion 30 within the main body 26. In this example, the track portion 30 runs along the entire length 20 of the first elongate member 12 on the main body 26, although in other examples the track portion 30 may extend only along a portion of the length 20 of the first elongate member 12.

Figure 3B:
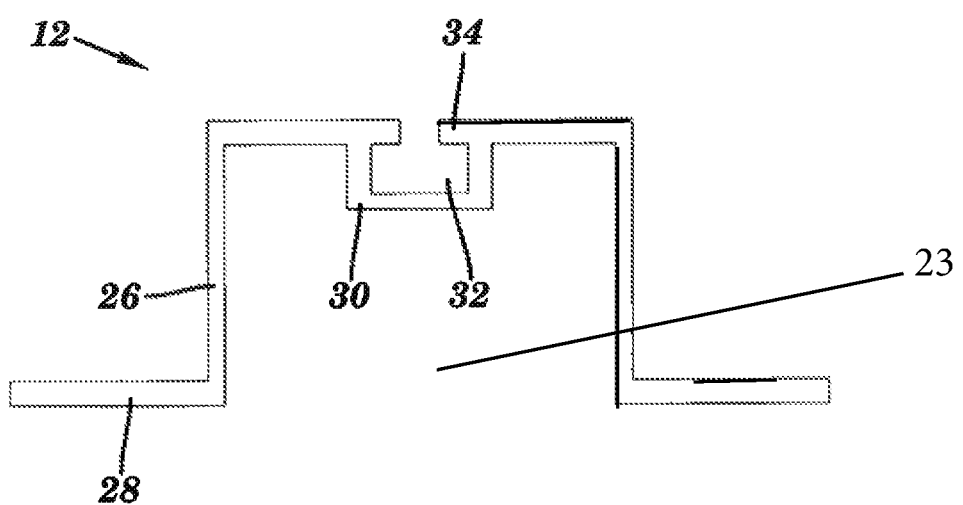

The track portion 30 provides an inner recess 32 in the main body 26 of the first elongate member 12 that is configured to receive a portion of the retaining mechanism 16(3) and the splicer support 18 as shown in FIGS. 1 and 2 and further described below, although other types and/or numbers of elements may be received with the track portion 30, such as an additional retaining mechanism 17(3) as shown in FIG. 2. The track portion 30 allows the retaining mechanism 16(3) and the splicer support 18 to be moveable along the length 20 of first elongate bracket member 12. The track portion 30 further includes overhang portions 34, as shown in FIG. 3B, that allow the retaining mechanism 16(3) to be securely located at a location along the length 20 of the first elongate member 12 as described in further detail below, although other configurations for locating the retaining mechanism 16(3) on the first elongate member 12 may be utilized. The track portion 30 allows the retaining mechanism 16(3) to be adjusted to be located at various locations along the first elongate member 12 to accommodate different sizes of the cable. Further, additional retaining mechanisms, such as the additional retaining mechanism 17(3) may be inserted into the track portion 30 to allow multiple cables to be stored on the cable storage device 10.

The first elongate member 12 has flange holes 36 located on the flanges 28 proximate the second end of the first elongate member 12, as shown in FIGS. 2 and 3A. The flange holes 36 are configured to receive bolts to attach the first elongate member 12 to the utility pole P as shown in FIG. 1. The first elongate member 12 also includes main body holes 40 located proximate the first end 22 of the first elongate member 12 on the main body 26. The main body holes 40 are configured to receive bolts (not shown) that secure the second elongate member 14 to the first elongate member 12, and the first elongate member 12 to the support structure, such as utility pole P as shown in FIG. 1. In other examples, other types and/or numbers of attachment mechanisms may be employed at different locations on the first elongate bracket member 12 to couple the first elongate bracket member 12 to a support structure, such as the utility pole P, and the second elongate member 14 to the first elongate member 12.

Referring now more specifically to FIGS. 1, 2, and 4, the second elongate bracket member is configured to be coupled to the first elongate bracket member 12 proximate the first end 22 of the first elongate member 12 such that the second elongate member 14 extends in a direction substantially perpendicular to the first elongate member 12 when installed on the utility pole P as shown in FIG. 1. The second elongate member 14 may have any dimensions suitable to hold the excess communications cable. In this example, the second elongate member 14 is formed from aluminum, although the second elongate member 14 may be formed of other types of materials, such as metals, plastics, or alloys, by way of example only.

The second elongate member 14 includes attachment holes 44 equally spaced about a central axis A of the second elongate member 14. The attachment holes 44 are configured to match up with the main body holes 40 of the first elongate member 12 to allow a pair of bolts (not shown) to be passed through to couple the second elongate member 14 to the first elongate member 12, and both the first elongate member 12 and the second elongate member 14 to the utility pole P as shown in FIG. 1, although other types and/or numbers of attachment mechanisms in other locations on the second elongate member 14 may be employed.

The second elongate member 14, in this example, further includes a plurality of retaining mechanism holes 46 that allow the retaining mechanisms 16(1) and 16(2) to be coupled to second elongate member 14 as described in further detail below, although the plurality of retaining mechanism holes 46 may receive additional elements or devices, such as the additional retaining mechanisms 17(1) and 17(2) as shown in FIG. 2. In this example, as shown in FIG. 4, the second elongate member 14 has 10 holes spaced apart along the length on opposing sides of the central axis A, although the plurality of retaining mechanism holes 46 may include other numbers of holes, or other attachment mechanisms, in other locations on the second elongate member 14. The plurality of retaining mechanism holes 46 are equally spaced about the central axis A of the second elongate member 14, such that the retaining mechanism 16(1) and 16(2) may be located at an equal distance from the central axis A of the second elongate member 14 to provide balance for the communications cable storage device 10 when support the excess communications cable C as shown in FIG. 1. The plurality of holes allows the location of the retaining mechanisms 16(1) and 16(2) to be adjusted to be located at various locations along the second elongate member 14 to accommodate different sizes of the cable. Further, additional retaining mechanisms, such as the additional retaining mechanisms 17(1) and 17(2) may be inserted into one or more of the plurality of retaining mechanism holes 46 to allow multiple cables to be stored on the cable storage device 10.

Referring now more specifically to FIGS. 1, 2, and 5-7, the retaining mechanisms 16(1)-16(3), as well as the additional retaining mechanisms 17(1)-17(3) will be described. The retaining mechanisms 16(1)-16(3) are configured to be removably coupled to either the first elongate bracket member 12 through the track portion 30 or the second elongate member 14 through the plurality of retaining mechanism holes 46. Although the retaining mechanisms 16(1) and 16(2) are illustrated coupled to the second elongate member 14 and the retaining mechanism 16(3) is illustrated coupled to the first elongate member 12, it is to be understood that the retaining mechanisms 16(1)-16(3) are interchangeable and could be located on either member. The retaining mechanisms 16(1)-16(3) are configured to receive and retain a communications cable, such as a fiber optic communications cable C shown in FIG. 1, on the cable storage device 10 during use, although additional types of cables may be stored using the retaining mechanisms 16(1)-16(3).

The retaining mechanisms 16(1)-16(3) share the same structure and will be described using like reference numerals. In this example, each of the retaining mechanisms 16(1)-16(3) includes a pair of retaining posts 50(1) and 50(2) and a retaining member 52 coupled to the retaining post 50(1) that is moveable between an open position to receive the communications cable C and a closed position, as illustrated in FIGS. 1 and 2, to retain the communications cable C, although the retaining member 52 could be coupled to the retaining post 50(2).

Figure 5A:
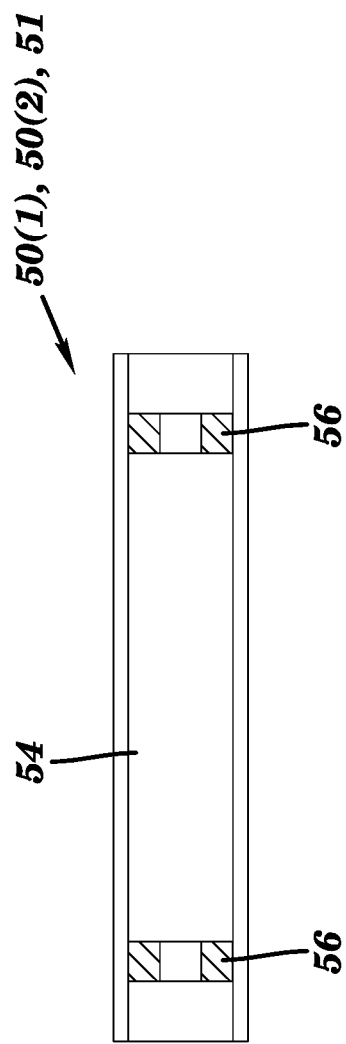
FIG. 5A is a side cross-sectional view of an exemplary retaining post of the exemplary cable storage device shown in FIG. 2.
Figure 5B:
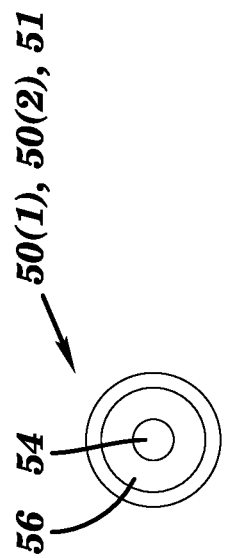
FIG. 5B is an end view of the exemplary post shown in FIG. 5A.

Referring now more specifically to FIGS. 5A and 5B, the retaining posts 50(1) and 50(2) are cylindrical structures having a hollow inner area 54, although the retaining posts 50(1) and 50(2) may have other shapes and configurations. In this example, the retaining posts 50(1) and 50(2) are formed from aluminum, although the retaining posts 50(1) and 50(2) may be formed of other types of materials, such as metals, plastics, or alloys, by way of example only. The retaining posts 50(1) and 50(2) may have various lengths depending on the application, and in particular, the amount of excess cable to be stored in the retaining mechanisms 16(1)-16(3). In one example, the retaining posts 50(1) and 50(2) have a length of about 9 inches, although other lengths, such as 8.625 inches or 8.25 inches may be utilized, by way of example only.

Figure 6:
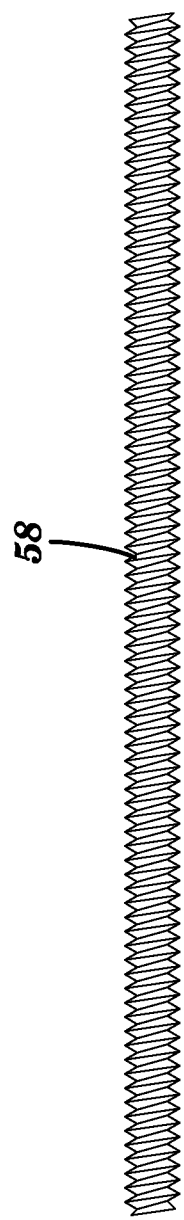
FIG. 6 is a side view of exemplary threaded rod of the exemplary cable storage device shown in FIG. 2 that may be employed with the exemplary post shown in FIGS. 5A and 5B.
Figure 7:
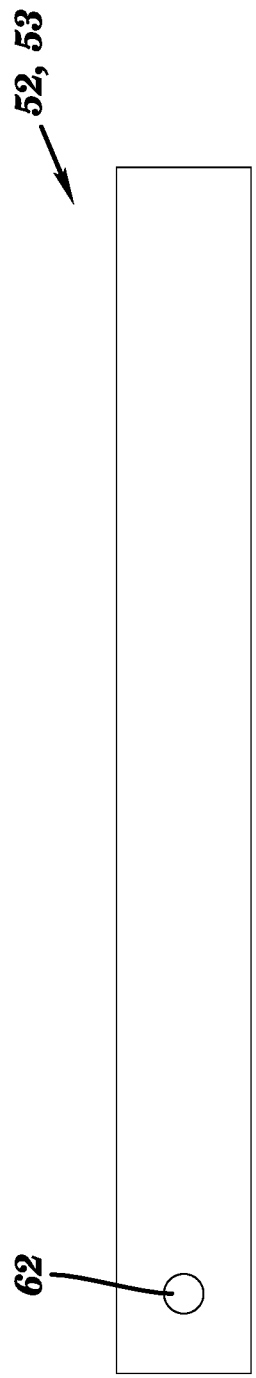
FIG. 7 is a side view of an exemplary rotatable retaining member of the exemplary cable storage device shown in FIG. 2.

The retaining posts 50(1) and 50(2) each include a pair of bushings 56 located in the hollow inner area 54 and configured to receive a threaded post 58, as shown in FIG. 6, passed through the hollow inner area 54. The threaded post 58 allows for coupling the retaining posts 50(1) and 50(2) to either the track portion 30 of the first elongate member 12 or the plurality of retaining mechanism holes 46 in the second elongate member 14, although the retaining elements 50(1) and 50(2) may have other elements in other combinations for receiving other attachment mechanisms. In this example, the threaded post 58 is formed from aluminum, although the threaded post 58 may be formed of other types of materials, such as metals, plastics, or alloys, by way of example only.

In one example, the threaded post 58 is at least a half inch diameter threaded post, although the threaded post 58 may have other diameters. The threaded post 58 has a length that is greater than the length of the retaining post 50(1) or 50(2) that it is to be inserted into. This allows the threaded post 58 to be secured to either the track portion 30 of the first elongate member 12 or the plurality of retaining mechanism holes 46 in the second elongate member 14 using nuts located on each end of the threaded post 58 that extend beyond the retaining posts 50(1) or 50(2). In one example, the threaded post 58 has a length of about 11 inches, although other lengths, such as 10.625 inches or 10.25 inches may be utilized, by way of example only.

The retaining member 52 includes a retaining member hole 62 configured to receive the threaded rod 58 so that the retaining member 52 can be secured to the retaining post 50(1) in this example, by a nut. In this example, the retaining member 52 is formed from aluminum, although the retaining member 52 may be formed of other types of materials, such as metals, plastics, or alloys, by way of example only. The retaining member 52 is rotatable on the threaded post 58 to be moveable between an open position to receive the communications cable C and a closed position, as illustrated in FIGS. 1 and 2, to retain the communications cable C. The rotation of the retaining mechanism 52 provides for easy installation and securing of the communications cable C, as shown in FIG. 1, in the communications storage device 10. In the closed position the retaining member 52 coupled to the retaining post 50(1) is in contact with a portion of the retaining post 50(2) such the communications cable C is retained in the space between the retaining posts 50(1) and 50(2) by the retaining member 52. In one example, the retaining post 50(2) further includes a retaining block 64 located on the threaded post 58 that interact with the retaining member 52 to retain the communications cable C. In this example, the retaining block 64 is formed from aluminum, although the retaining block 64 may be formed of other types of materials, such as metals, plastics, or alloys, by way of example only.

Referring now more specifically to FIG. 2, in one example, the additional retaining mechanisms 17(1)-17(3) may be employed to allow for the storage of an additional cable. The retaining mechanisms 17(1)-17(3) share the same structure and will be described using like reference numerals. The retaining mechanisms 17(1)-17(3) include a single retaining post 51 and a retaining member 53. The retaining post 51 is the same in structure and operation as the retaining posts 50(1) and 50(2) described above. The retaining member 53 is the same in structure and operation as the retaining member 52 as described above.

The additional retaining mechanisms 17(1)-17(3) are configured to be removably coupled to either the first elongate bracket member 12 through the track portion 30, or the second elongate member 14 through the plurality of retaining mechanism holes 46. Although the retaining mechanisms 17(1) and 17(2) are illustrated coupled to the second elongate member 14 and the retaining mechanism 17(3) is illustrated coupled to the first elongate member 12, it is to be understood that the retaining mechanisms 17(1)-17(3) are interchangeable and could be located on either member. The additional retaining mechanisms 17(1)-17(3) are configured to receive and retain a communications cable, such as a fiber optic communications cable, on the cable storage device 10 during use, although additional types of cables may be stored using the retaining mechanisms 17(1)-17(3). The additional retaining mechanisms 17(1)-17(3) allow for a second communications cable having, in this example, a smaller wind radius, to be stored on the cable storage device 10, such that the cable storage device 10 may store multiple cables.

The retaining member 53 is coupled to the retaining post 51 in the same manner as described above with respect to the retaining post 50(1) and the retaining member 52. The retaining member 53 is rotatable on the threaded post 58 to be moveable between an open position to receive the communications cable C and a closed position, as illustrated in FIG. 2, to retain a cable. The rotation of the retaining member 53 provides for easy installation and securing of an additional communications cable in the communications storage device 10. In the closed position the retaining member 53 coupled to the retaining post 51 is in contact with a portion of the retaining post 50(1) such a communications cable is retained in the space between the retaining posts 51 and 50(1) by the retaining member 53.

Referring now more specifically to FIGS. 1 and 2, the splicer support 18 is configured to be inserted in and secured at a point along the track portion 30 of the first elongate member 12. The splicer support 18 allows a splicer device S to be installed on the cable storage device 10. This allows for easy access to utilize the splicer device with the excess communications cable C stored on the cable storage device 10.

An exemplary method of installing the cable storage device 10 of the present technology will now be described with reference to FIGS. 1-7. The first elongate bracket member 12 is coupled to a support structure, such as the utility pole P as shown in FIG. 1, although the elongate bracket member 12 may be coupled to any support structure where the storage of cable is desired. In this example, the first elongate member 12 is coupled to the utility pole by inserting the bolts through the flange holes 36 an into the support structure. Additional bolts (not shown) are passed through the main body holes 40 to couple the first elongate member 12 to the utility pole P. In other examples, other types and/or numbers of attachment mechanisms may be employed at different locations on the first elongate bracket member 12 to couple the first elongate bracket member 12 to a support structure, such as the utility pole P.

Next, the second elongate bracket member 14 is coupled to the first elongate bracket member 12 at a location proximate the first end such that the second elongate member 14 extends in a direction substantially perpendicular to the first elongate member 12 when installed on the utility pole P. In this example, the attachment holes 44 on the second elongate member 14 are matched up with the main body holes 40 of the first elongate member 12 and a pair of bolts (not shown) are passed through to couple the second elongate member 14 to the first elongate member 12, and both the first elongate member 12 and the second elongate member 14 to the utility pole P as shown in FIG. 1, although other types and/or numbers of attachment mechanisms in other locations on the second elongate member 14 may be employed Once the first elongate member 12 and the second elongate member 14 are secured to the utility pole P, the splicer support 18 may optionally be located along the track portion 30 of the first elongate member 12 to allow for storage of the splicer device S on the cable storage device 10 as shown in FIG. 1. The splicer device S is then coupled directly to the splicer support 18.

Next, the retaining mechanisms 16(1) and 16(2) are coupled to the second elongate member 14 through the plurality of retaining mechanism holes 46. In this example, the retaining posts 50(1) and 50(2) of the retaining mechanisms 16(1) and 16(2) are located spaced apart in the plurality of retaining mechanism holes 46 so that the two retaining mechanisms 16(1) and 16(2) are located an equal distance from the first elongate member 14. The position of the retaining mechanisms 16(1) and 16(2) is customizable by using different holes in the second elongate member 14 to accommodate different sizes of cable. The retaining posts 50(1) and 50(2) are spaced apart based on the size of the retaining member 52, which is attached to the retaining post 50(1), utilized.

Next, the retaining mechanism 16(3) is located in the track portion 30 of the first elongate member 12. In this example, the retaining posts 50(1) and 50(2) of the retaining mechanism 16(3) are coupled to the track portion 30 through nuts located on the threaded rod 58. The position of the retaining mechanism 16(3) along the track portion 30 is customizable depending on the size of the cable to be stored. The retaining posts 50(1) and 50(2) are spaced apart along the track portion 30 based on the size of the retaining member 52, which is attached to the retaining post 50(1), utilized.

Optionally, the additional retaining mechanisms 17(1)-17(3) may be installed on the cable storage device 10 in the same manner as the retaining mechanisms 16(1)-16(3) described above to allow a second cable to be stored on the cable storage device. Although two sets of retaining mechanisms are described to store two separate cables, it is contemplated that additional retaining mechanisms may be employed in the same manner to store additional cables.

Accordingly, examples of the present technology provide a modular storage device for the slack communications or other cables. Examples of this technology provide an all bolt together assembly that is easily assembled on the utility pole P in the field using minimal equipment. Examples of this technology are also easily adjustable and customizable to allow for storing multiple coils of slack cable of different types and/or sizes. Further, examples of this technology advantageously allow for quick and easy access to the stored cable in the field.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A modular cable storage device comprising:
a first elongate bracket member attachable to a support structure, the first elongate bracket member having a length extending between a first end and a second end and a track portion extending along the length between the first end and the second end;
a second elongate bracket member configured to be coupled to the first elongate bracket member proximate one of the first end or the second end such that the second elongate member extends in a different direction from the first elongate member when installed on the support structure, the second elongate bracket member having a plurality of holes spaced along a length thereof;
at least one set of a plurality of retaining mechanisms, each of the at least one set of the plurality of retaining mechanisms comprising a first retaining post and a second retaining post that are configured to be both moveable and securable at a first plurality of locations along the track portion of the first elongate bracket member and interchangeably also configured to be separately coupled to the second elongate bracket member in a pair of the plurality of holes, and a first retaining member that is coupled to the first retaining post and is moveable between an open position not in contact with the second retaining post to receive a first cable and a closed position in contact with the second retaining post to retain the first cable.

2. The device of claim 1, wherein the first retaining post and the second retaining post each comprise a securing device to separately removably couple the first retaining post and the second retaining post of each of the at least one set of the plurality of retaining mechanisms to the cable storage device.

3. The device of claim 1 further comprising:
another set of a plurality of retaining mechanisms configured to be coupled to the first and second elongated bracket members to receive and store a second cable.

4. The device of claim 3, wherein each of the another set of the plurality of retaining mechanisms comprises a third retaining post coupled to a second retaining member that is moveable between an open position to receive the second cable and a closed position to retain the second cable.

5. The device of claim 4, wherein the third retaining post comprises a securing device to separately removably couple the third retaining post of each of the another set of the plurality of retaining mechanisms to the cable storage device.

6. A method for installing a modular cable storage device comprising:
attaching a first elongate bracket member having a length extending between a first end and a second end and a track portion extending along the length between the first end and the second end to a support structure;
coupling a second elongate bracket member to the first elongate bracket member proximate one of the first end or the second end such that the second elongate member extends in a different direction from the first elongate member when installed on the support structure, the second elongate bracket member having a plurality of holes spaced along a length thereof; and
coupling at least one set of a plurality of retaining mechanisms to the cable storage device to receive and store a first cable, each of the at least one set of the plurality of retaining mechanisms comprising a first retaining post and a second retaining post that are configured to be both moveable and securable at a first plurality of locations along the track portion of the first elongate bracket member and interchangeably also configured to be separately coupled to the second elongate bracket member in a pair of the plurality of holes, and a first retaining member that is coupled to the first retaining post and is moveable between an open position not in contact with the second retaining post to receive the first cable and a closed position in contact with the second retaining post to retain the first cable.

7. The method of claim 6, wherein the first retaining post and the second retaining post each comprise a securing device to separately removably couple the first retaining post and the second retaining post of each of the at least one set of the plurality of retaining mechanisms to the cable storage device.

8. The method of claim 6, further comprising:
coupling another set of a plurality of retaining mechanisms configured to be coupled to the first and second elongated bracket members to receive and store a second cable.

9. The method of claim 8, wherein each of the another set of the plurality of retaining mechanisms comprises a third retaining post coupled to a second retaining member that is moveable between an open position to receive the second cable and a closed position to retain the second cable.

10. The method of claim 9, wherein the third retaining post comprises a securing device to separately removably couple the third retaining post of each of the another set of the plurality of retaining mechanisms to the cable storage device.

11. A method of making a modular cable storage device comprising:
providing a first elongate bracket member attachable to a support structure, the first elongate bracket member having a length extending between a first end and a second end and a track portion extending along the length between the first end and the second end;
coupling a second elongate bracket member to the first elongate bracket member proximate one of the first end or the second end such that the second elongate member extends in a different direction from the first elongate member when installed on the support structure, the second elongate bracket member having a plurality of holes spaced along a length thereof;
coupling at least one set of a plurality of retaining mechanisms to the first elongate bracket member or the second elongate bracket member to receive and store a first cable, each of the at least one set of the plurality of retaining mechanisms comprising a first retaining post and a second retaining post that are configured to be separately coupled to the first elongate bracket member and interchangeably also configured to be separately coupled to the second elongate bracket member, and a first retaining member that is coupled to the first retaining post and is moveable between an open position not in contact with the second retaining post to receive the first cable and a closed position in contact with the second retaining post to retain the first cable, wherein the first elongate bracket member comprises a track portion extending along the length between the first end and the second end, wherein at least one of the at least one set of the plurality of retaining mechanisms is moveable and securable at a first plurality of locations along the track portion of the first elongate bracket member.

12. The method of claim 11, wherein the first retaining post and the second retaining post each comprise a securing device to separately removably couple the first retaining post and the second retaining post of each of the at least one set of the plurality of retaining mechanisms to the cable storage device.

13. The method of claim 11 further comprising:
coupling another set of a plurality of retaining mechanisms configured to be coupled to the first and second elongated bracket members to receive and store a second cable.

14. The method of claim 13, wherein each of the another set of the plurality of retaining mechanisms comprises a third retaining post coupled to a second retaining member that is moveable between an open position to receive the second cable and a closed position to retain the second cable.

15. The method of claim 14, wherein the third retaining post comprises a securing device to separately removably couple the third retaining post of each of the another set of the plurality of retaining mechanisms to the cable storage device.

\* \* \* \* \*